Jan. 5, 1971  H. D. COALE  3,553,068
FOAMED CUSHIONING MATERIAL
Filed Oct. 11, 1967

INVENTOR.
H.D. COALE

BY *Young and Quigg*

ATTORNEYS

United States Patent Office 3,553,068
Patented Jan. 5, 1971

3,553,068
FOAMED CUSHIONING MATERIAL
Harold D. Coale, Bartlesville, Okla., assignor to Phillips Petroleum Company, a corporation of Delaware
Filed Oct. 11, 1967, Ser. No. 674,610
Int. Cl. B32b *1/00, 3/00*
U.S. Cl. 161—125                              7 Claims

ABSTRACT OF THE DISCLOSURE

A cushioning material is produced by forming a softened sheet of foamed thermoplastic material in a forming press to produce hollow, raised projections of the foamed material on the sheet.

BACKGROUND OF THE INVENTION

This invention relates to foamed cushioning material. In one aspect, it relates to cushioning material made by producing a series of bubble-like projections in a sheet of foamed plastic. In another aspect, it relates to a method of forming a series of hollow projections on a sheet of foamed thermoplastic material by means of a forming press. In another aspect, it relates to the formation of hollow protrusions on a sheet of foamed thermoplastic material, those protrusions having straight interior side walls surmounted by a dome-shaped roof, and concave exterior side walls surmounted by a dome-shaped roof. In another aspect, it relates to an apparatus for forming the cushioning material of this invention.

An object of this invention is to provide novel cushioning material.

Another object of this invention is to provide a method for producing sheet-like cushioning material useful for packing articles for shipment.

A further object of this invention is to provide a novel apparatus adaptive to produce cushioning material from foamed thermoplastic sheets.

SUMMARY OF THE INVENTION

According to my invention, a cushioning material is formed from a sheet of foamed resilient material by forming thereon raised, hollow projections of that foamed material. The projections can be formed by subjecting a sheet of the foamed plastic material to the action of matching die sections of a forming press.

DESCRIPTION OF THE DRAWINGS

The cushioning material of my invention and the method of making it can be seen by reference to the drawings.

Referring now to FIG. 1, it will be seen that the cushioning material of my invention is formed by a raised projection 11 which can perhaps best be described as being mushroom-shaped. The projection is formed by a dome-shaped roof 12 surmounting side walls 13. These side walls are concave on their exterior surface. The projection arises from essentially planar sheet 14.

Figure 1:
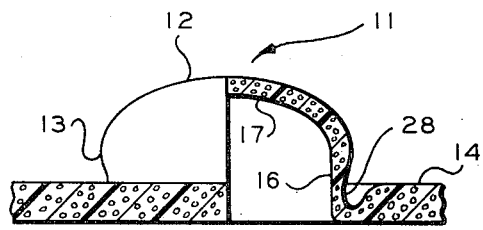
FIG. 1 shows one of the projections of the cushioning material of my invention, partly in cross-section.

As is shown in the cut-away section of FIG. 1, the interior side walls 16 of the projection are straight. These straight interior side walls are surmounted by interior dome-shaped roof 17. The coaction of the concave exterior wall and straight interior wall provides a degree of strength and resiliency which is superior to that which would be obtained if the side walls were of uniform thickness and either straight or of concave-convex form.

Figure 2:
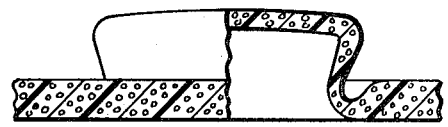
FIG. 2 shows the shape assumed by the projection when compressing force is applied thereto.

When a compressive force is applied to the top of a projection, the dome-shaped roof tends to collapse, and the mushroom shape of the projection becomes more pronounced, as is indicated in FIG. 2. As will be appreciated by one skilled in the art, the resistance of the projection to deformation increases as the deformation becomes more pronounced. Therefore, the initial deformation of a projection requires little force, and yet a great deal of force will be required to completely compress the projection to the point at which no further deformation will take place under added stress.

Figure 3:
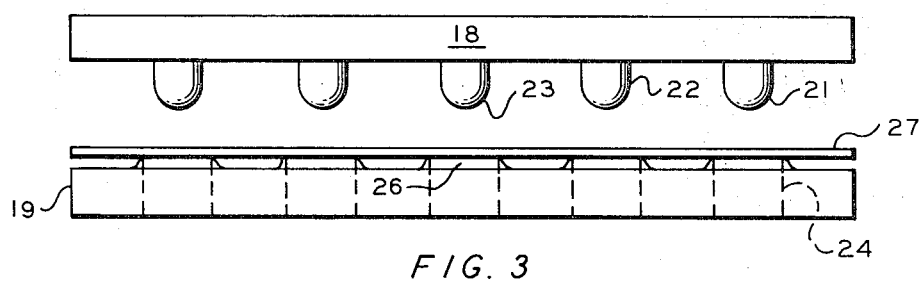
FIG. 3 shows the apparatus for forming projections in a sheet of foamed plastic material.

The apparatus used for making the cushioning material of my invention is shown in FIG. 3, and consists essentially of a forming die having male and female portions. The upper, or male portion 18 of the mold has a plurality of protrusions 21. These protrusions have straight side walls 22 surmounted by a rounded top 23. The lower, or female mold 19 is provided with a plurality of forming cavities 24 adapted to receive protrusions 21 from the upper die. These cavities are conveniently open at the bottom.

Each of the cavities in the lower mold has an upstanding annular ring 26 surrounding the cavity. The function of this ring will be more evident in the discussion of FIGS. 4 and 5.

In operation, a sheet of foamed thermoplastic material 27 in a softened condition is placed between the upper and lower molds. The foamed material must be sufficiently warm to be readily deformable by the dies, but must not be so warm that the viscosity is lowered to a point where the foam collapses. In general, a foamed sheet directly from an extruder will be used. This type of exterior of extruder is well known in the art.

Figure 4:
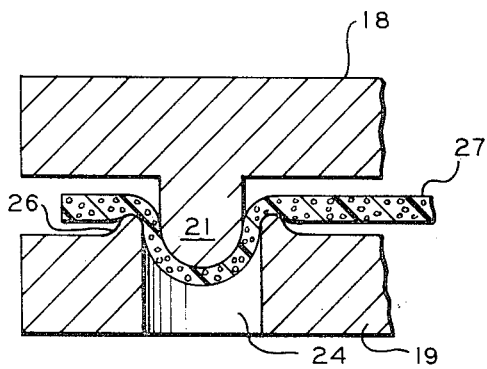
FIG. 4 shows a projection partially formed.
Figure 5:
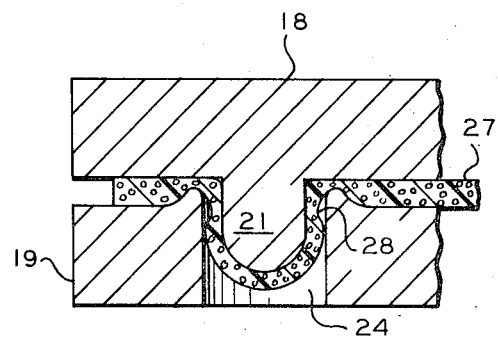
FIG. 5 shows the forming die completely closed to form a projection.

As is shown in FIG. 4, die 21 forces a portion of sheet 27 into cavity 24. Since the lower mold is water cooled, the portion of foamed sheet 27 touching upstanding annular ring 26 solidifies at the point of contact. Therefore, as the die 21 moves further downwardly, all stretching of the material takes place within the cavity itself, and additional sheet material 27 is prevented from being pulled into the cavity with the advance of die 21 by the action of the solidified material against annular ring 26.

When the die 21 reaches the extent of its downward travel, there will have been considerable stretching of the sheet material. Because of the solidified portion at annular ring 26, thre will be a considerable necking down of the sheet material at that point. It is this necking down which forms the concave configuration of the outer wall of the protrusion, as is shown at 28.

DESCRIPTION OF THE PREFERRED EMBODIMENTS

In order to provide the desired degree of resiliency, the height of the protrusions on the cushioning material of my invention should be at least two times the thickness of the sheet material. The protrusions may be preferably circular in cross-section, but they also can be polygonal. When they are circular in cross-section, it is desirable that the diameter of the protrusion be at least twice the height of the protrusion.

The thermoplastic material suitable for forming the cushioning material of my invention is any material which has some degree of inherent resiliency and which can be foamed. Thus, the cushioning material of my invention could be made of foamed polyethylene, polypropylene, ethylenepropylene copolymer, ethylene-vinyl acetate, or combinations of these materials.

The arrangement of the protrusions on the sheet of material will, of course, depend upon the planned use for the material. Ordinarily, the protrusions would occur in an ordered arrangement, preferably in straight lines. For the best cushioning effect, the protrusions should be placed just far enough apart so that their edges will almost touch when fully compressed.

SPECIFIC EXAMPLE

A foam sheet ¼" thick x 12" wide was made in a conventional manner from a low density polyethylene of .921 density and a melt index of 3. Ammonium carbonate was used as the foaming agent. The sheet was maintained at 250° F. for insertion into the forming press. Foamed cushion pads were made in the sheet which were ¾" high above the sheet, an OD of 1¾", an ID of 1½", and OD of 1⅝" in the neckdown area. Sheet thickness at the base of the ring was ⅛".

The cushioning material of my invention finds utility as a cushioning material for packaging large instruments or apparatus during shipment. It also finds utility in furniture cushions. Being completely weatherproof, my cushioning material can readily be used an outdoor furniture.

It is necessary that the cushioning material of this invention be a foamed material. When unfoamed sheet material is used in the process disclosed above, there is virtually no necking down of the material at annular ring 26, and the projections formed are inadequate in cushioning ability due to this difference in structure.

Reasonable variation and modification are permissible within the scope of my disclosed invention without departing from the spirit thereof.

I claim:

1. Cushioning material comprising a sheet of foamed resilient material having thereon at least one raised, hollow projection of said foamed resilient material, each of said raised, hollow projections having straight interior side walls surmounted by a dome-like roof and a concave undercut surrounding the exterior of each projection at the juncture with adjacent sheet material forming a necked down section in the side wall of each projection so as to give each projection a spring-like action resisting compressive forces applied to the top of each projection.

2. The material of claim 1 wherein said sheet contains a plurality of protrusions positioned in an ordered arrangement, the protrusions being positioned far enough apart so that their edges will almost touch when fully compressed.

3. The material of claim 1 wherein said projection is circular.

4. The material of claim 1 wherein said projection is polygonal.

5. The material of claim 1 wherein said material is polyethylene, polypropylene, ethylene-propylene copolymer, or ethylene-vinyl acetate.

6. The material of claim 1 wherein the height of said projection is at least two times the thickness of said sheet.

7. The material of claim 6 wherein said projection is circular, and the diameter of said projection is at least two times its height.

References Cited

UNITED STATES PATENTS

| | | | |
|---|---|---|---|
| 3,196,315 | 7/1965 | Peterson | 161—131 |
| 3,399,098 | 8/1968 | Omoto et al. | 161—133 |

FOREIGN PATENTS

| | | | |
|---|---|---|---|
| 234,032 | 6/1964 | Austria | 166—130 |
| 685,454 | 4/1964 | Canada | 161—131 |

MORRIS SUSSMAN, Primary Examiner

U.S. Cl. X.R.

5—345; 18—42; 161—130; 264—321